United States Patent
Lowery

(10) Patent No.: US 6,446,111 B1
(45) Date of Patent: Sep. 3, 2002

(54) METHOD AND APPARATUS FOR CLIENT-SERVER COMMUNICATION USING A LIMITED CAPABILITY CLIENT OVER A LOW-SPEED COMMUNICATIONS LINK

(75) Inventor: Keith A. Lowery, Richardson, TX (US)

(73) Assignee: epicRealm Operating Inc., Richardson, TX (US)

( * ) Notice: Subject to any disclaimer, the term of this patent is extended or adjusted under 35 U.S.C. 154(b) by 0 days.

(21) Appl. No.: 09/336,186

(22) Filed: Jun. 18, 1999

(51) Int. Cl.$^7$ ............................................. G06F 158/16
(52) U.S. Cl. ...................... 709/203; 709/200; 709/315; 707/10; 707/103; 345/326; 345/332; 345/333; 345/334; 345/335
(58) Field of Search ................................ 709/203, 200, 709/315; 707/10, 103; 345/332, 333, 334, 335, 326

(56) References Cited

U.S. PATENT DOCUMENTS

| | | | | |
|---|---|---|---|---|
| 5,901,286 A | * | 5/1999 | Danknick et al. ........... | 709/203 |
| 5,923,885 A | * | 7/1999 | Johnson et al. ............... | 717/11 |
| 5,928,323 A | * | 7/1999 | Gosling et al. ............. | 709/203 |
| 5,999,941 A | * | 12/1999 | Andersen ..................... | 707/103 |
| 6,026,474 A | * | 2/2000 | Carter et al. ................. | 711/202 |
| 6,054,983 A | * | 4/2000 | Simomoff et al. .......... | 345/335 |
| 6,108,687 A | * | 8/2000 | Craig .......................... | 709/203 |
| 6,125,402 A | * | 9/2000 | Nagarajayya et al. ....... | 709/304 |
| 6,131,096 A | * | 10/2000 | Ng et al. ...................... | 707/10 |
| 6,181,781 B1 | * | 1/2001 | Porter et al. ............. | 379/88.17 |

OTHER PUBLICATIONS

IBMTD, vol, No. 37, issue 4B, p. 325–328, title : Strategy for supporting CM/2 and DB/2 with . . . , Apr. 1994.*

IBMTD, vol. No. 41, issue 1, pp. 711–712, title : Information Retrieval and Presentation Apparatus . . . Jan. 1998.*

XP–000827900: Pich, Joachim, et al., "Plug–and–Play im Netz So funktioniert Jini", Wissen & Trend, Chip Zeitschrift Fuer, pp. 244–247/ Apr. 4, 1999.

XP–002154835: Lemay, L., et al., "Teach Yourself Java 1.2 in 21 Days", Sams Publishing, pp. 11–12, p. 19, and pp. 136–138, May 1998.

Fox, A., et al., "Reducing WWW latency and bandwidth requirements by real–time distillation", Computer Networks and ISDN Systems, pp. 1445–1456, Jun. 15, 1996.

XP–002154834: Sun, "What is the Java™ Platform Micro Edition?". Online web page address: http://www.sun.com/consumer–embedded/cover/j2me.html, retrieved on Dec. 5, 2000, Jun. 15, 1999.

WO 00/17783: Inventors—Taivalsaari, A., et al, Applicant—Sun Microsystems, Inc., "Method and Apparatus for Managing Class Files on Devices Without a File System", Application No. PCT/US99/20079, Specification—33 pgs., Drawings—14 pgs, Mar. 30, 2000.

WO 00/17783: Sun Microsystems, Inc., Application No. PCT/US99/20079, substitute page Nos. 2–14, Mar. 30, 2000.

* cited by examiner

Primary Examiner—Ayaz Sheikh
Assistant Examiner—Frantz B. Jean
(74) Attorney, Agent, or Firm—Baker Botts L.L.P.

(57) ABSTRACT

A request is sent from a client (12) to a server (18) over a communications link (16). A web server (20) on the server responds to the request with a dynamically generated, selected characteristic enabled, transient applet (26) including a plurality of data items (28) therein. The data items are represented in the applet as a plurality of respective non-updateable, pre-loaded elements (36) and a subset of the data items may be represented by respective updateable elements (38). The applet is executed on the client and then substantially discarded when the client no longer requires the data or services of the applet.

27 Claims, 2 Drawing Sheets

METHOD AND APPARATUS FOR CLIENT-SERVER COMMUNICATION USING A LIMITED CAPABILITY CLIENT OVER A LOW-SPEED COMMUNICATIONS LINK

TECHNICAL FIELD OF THE INVENTION

This invention relates in general to client-server systems and, more particularly, to a method and apparatus for client-server communication involving a dynamically generated, transient applet having selected characteristics enabled therein as a response to a request from a limited capability client coupled to the server through a communications link.

BACKGROUND OF THE INVENTION

Traditionally, programs have been designed toward the goal of writing the program once and then using the program, with little-to-no modification, to access and utilize a large variety of different types of data. Such "generic programming" concepts have lead to the development of many generic programming methods for accessing and utilizing data. One common generic design method is to provide a single interface to a user or programmer for data access and utilization while providing multiple specific "backends" for accessing and utilizing different types of data. One example of such a generic design method is the open database connectivity standard (ODBC). ODBC provides a single interface that can be used to access various databases by using the single interface in combination with multiple backends wherein each backend is tailored to a specific database. Many other standards similar to the ODBC standard, which provide similar generic-to-specific functionality, have been developed and are presently in use today. A disadvantage to the single interface with multiple backends is that numerous different types of systems, each with their own specific interface requirements, have been developed and have necessitated the creation of numerous back-ends. In short, underneath a single interface there is typically a backend specific implementation or implementations. Another disadvantage to such generic systems is that often all or many of the different backends are included with each piece of application software written to use the generic interface so that the application software can utilize a large variety of specific systems.

As computer technology has advanced, computers and electronic devices have become smaller and smaller. Along with the shrinking of computers has come the creation of handheld and credit-card-size computers. The personal digital assistants that have appeared are common examples of handheld and credit-card-size computers. The small size and easy portability of the handheld and credit-card-size computers has limited the amount of physical memory and secondary storage that may be included in these devices. "Physical memory" is used here to refer to memory, such as random access memory (RAM), that loses its contents in the absence of electrical or battery power. "Secondary storage," as used here, refers to persistent storage such as hard drives, CD-ROMs, and floppy disks which retain their contents in the absence of electrical or battery power.

Traditional methods of computer-to-computer communication have involved wire-based networks. An example of such a wire-based network technology is the 10baseT Ethernet networks used in many corporations. Handheld and credit-card-size computers are typically not suited to traditional wire-based networking methods. Thus, wireless communications methods are often used with handheld and credit-card-size computers for networking with other computers. For example, many handheld and credit-card-size computers communicate with other computers or devices using infrared light or over the cellular phone network.

Infrared light and the cellular phone networks share the limitation of having a low speed relative to wire-based networks. Traditional network applications, having been developed on wire-connected computers, often do not take into account the limitations imposed by the low-speed connections used by handheld and credit-card-size computers. For example, the World Wide Web (the "web") uses the HyperText Transfer Protocol which may require a server system to resend an entire web page even if only a single data item on that web page has to be updated. For another example, many traditional web-enabled applications utilize plug-ins that must be loaded onto the client to allow the client to use the particular functionality of a server. The plug-ins typically remain on the client following the termination of an interactive session and, thus, consume the limited storage resources of handheld devices. Handheld and credit-card-size computers may have no secondary storage, thus requiring the plug-ins to be stored in the limited physical memory of the device which reduces the amount of memory available for use by other applications running on the handheld and credit-card-size computers.

SUMMARY OF THE INVENTION

From the foregoing, it may be appreciated that a need has arisen for a method and apparatus for responding to a client request so as to reduce bandwidth usage over a low-speed connection and reduce the consumption of storage space on the client.

According to one embodiment of the present invention, a data processing system is provided that comprises a client device coupled to a communications link and operable to communicate a request over the communications link. The system further comprises a server coupled to the communications link and operable to receive the request and to collect a plurality of data items from a plurality of distinct sources where the data items comprise information collected as a function of the request. The system also comprises an executable applet dynamically generated by the server in response to the request, a constituent system associated with the applet comprising a subset of the data items, each data item in the subset used as a pre-loaded value in the applet. The applet is operable to be transferred over the communications link to the client device and the client device is operable to execute the applet to access the subset of the data items.

According to another embodiment of the present invention, the pre-loaded values are non-updateable.

According to another embodiment of the present invention, the applet further comprises a plurality of updateable elements.

The present invention provides a number of technical advantages. One such technical advantage is the capability to respond to client requests for information from a server using a dynamically generated, selected characteristic enabled, transient applet. The applet that is sent to the client is substantially self-sufficient and depends on substantially no services being available on the client for the applet to use. For example, if a person is trying to buy a book from an online book seller, the online bookseller may provide the user with a customized capability for book browsing and the applet will comprise the requisite functionality for the custom book browser and the necessary data for the client to use with the book browser. Accordingly, the use of such an applet allows the human operator of a handheld device which has limited memory and limited or no secondary storage capabilities to initiate and complete a transaction with a server without having to load and store a variety of support programs which may be required by the server. Another advantage is that by discarding the applet after a transaction, each transaction between the client and the server may be made independently of previous transactions and with little or no post-transaction impact on the limited resources of the client.

A further advantage is that the total amount of data transferred between the client and the server over a communications link is decreased. By transmitting the appropriate data and associated data handling capabilities as a group, the client may be required to communicate over a low-speed communications link a greatly reduced number of times or, in some cases, only once. Yet another advantage is found in the avoidance of transmitting duplicate data by using updateable elements and a loader within the applet to load only new data desired by the client from the server, instead of completely retransmitting all the information in order to include small changes.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Figure 1:
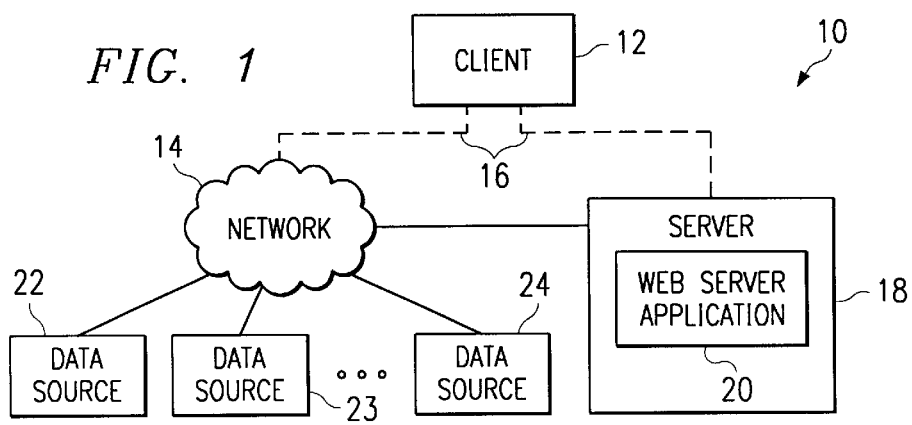
FIG. 1 is a block diagram of a client-server system as used in the present invention.

The Internet is a world wide network of networks that links many computers through many separate, but intercommunicating, networks. Using the Internet, users can access vast amounts of stored information and establish communication with other Internet capable computers.

Much of the Internet is based on the client-server model of information exchange and processing. The client-server model, which is a computer architecture, generally uses a server or host for servicing a number of less powerful computers. The server is typically a single powerful computer or a group of computers that may behave as a single computer. The less powerful computers are typically called clients, and the clients couple to the server over one or more communication links. Servers typically have greater processing power than clients. For example, the server may comprise a mainframe, mini-computer, or powerful personal computer, while clients generally comprise simpler and less powerful personal computers. One type of client that is typically significantly less powerful than the server comprises the group of portable, handheld computers known as personal digital assistants (PDAs). PDAs may comprise only a limited amount of physical memory, as compared to servers, and no secondary storage capabilities. "Secondary storage" as used here refers to hard drives, CD-ROMs and the like which retain their contents even in the absence of electrical or battery power. "Physical memory" as used here refers to memory that loses its contents in the absence of electrical or battery power, for example, the random access memory (RAM) found in many computers. An example of a computer known as a personal digital assistant is the PalmPilot by 3Com, another example is the growing number of cellular phones with alphanumeric displays and additional functionality such as calendars, phone lists, and other functionality. PDAs often comprise physical memory less than 8 megabytes and no secondary storage capability, while servers often comprise physical memory measured in the hundreds of megabytes, or even in the gigabyte range, and secondary storage capabilities in the tens to hundreds of gigabytes range. Clients usually communicate with a single server at any one time, although clients may communicate with each other using the server or they may use the server to communicate with other servers.

The Internet supports various protocols for information transfer between clients and servers. The World Wide Web (hereinafter the "web") is one of the most popular of the Internet's information transfer protocols. Web-accessible information is identified by a Uniform Resource Locator ("URL") which specifies the location of information on the Internet in terms of a specific computer and a location on that computer of a file having the information. Any computer connected to the Internet may access the file with the proper communication protocol and the URL of the desired information. Typically, the URL has the format http:\ \<host>\<path>, where "http" refers to the HyperText Transfer Protocol, which comprises the communication protocol, "<host>" is the Internet identifier of one of the servers on the Internet, and "<path>" specifies the location of the information on the server. A website is typically a set of information stored on a computer connected to the Internet which makes information on the computer available to other server and client computers on the Internet. The information made available by the website is typically broken down into one or more "web pages", which comprise formatted, tree-structured information. The information on the web pages may comprise text, images, sounds, and animations or other information.

One important ability of the web is the connection of one document to many other documents using hypertext links. A link typically appears as an underlined portion of text in a document, and when the user of a document which has hypertext links therein moves the cursor or mouse pointer over the underlined text and clicks, the document referred to by the selected link is retrieved. The linked document may be located on the same server or on a different server from the original document.

Hypertext and web searching capabilities are typically implemented on the client using a computer program called a "web browser". When the client is connected to the Internet, the web browser utilizes URLs, which may be provided either directly by the user or by a link that the user has clicked on, to locate, retrieve, and display the information at the URL. Display is used here very generally and may comprise basic rendering of pictures and text, real time playing of audio and video segments, printing of data, or storage of data for later use or display. Clients typically use the web browser to view web pages by using the web browser to retrieve web pages from servers and then displaying the information in the web pages locally on the client.

Traditionally, web pages have been written in the HyperText Markup Language ("HTML") which is used to specify the layout and content of the web page. However, HTML is primarily suited only for relatively simplistic representation of data web pages. A web page typically may provide only predetermined information, in a predetermined format, to the client. To provide "dynamic" information, which is information that may be different for different clients and different users of clients, or to provide complex information, such as graphs and animations, typically requires the use of programs on the server external to the web page to change the web page for the different clients. Dynamic web pages may necessitate the inclusion of user or client specific information in the web page, providing animations on the web page, changing the appearance of the web page in response to the position of the cursor on the web page, or providing other suitable dynamic changes to the web page. For example, in order to include the name of a person accessing the web page using the web browser, the web server would have to use an additional, external program in addition to the web page. The external program would acquire the user's name, build a new web page incorporating that name, save that web page on the web server, and then send the newly created web page to the client.

The external programs used to provide dynamic or complex web pages to clients have grown in ability and complexity and have resulted in the development of "plug-ins". Plug-ins are typically external modules or add-on programs run on the client which are used to provide various abilities, such as dynamic capabilities, to web pages. Plug-ins are typically attached or added to the web browser on the client and stored on the client so that the client may process and display the dynamic web page after the web page has been retrieved by the client. An example of a plug-in may comprise the Shockwave plug-in from Macromedia. In particular, Shockwave, when installed on a client, allows the viewing on the client of multimedia files and multimedia effects which are embedded as part of the web page.

The added abilities provided by plug-ins are not free of effect on the client however. When the web browser encounters web content requiring a plug-in that the web browser has never before encountered, the needed plug-in is typically downloaded to the client from the server and added to the web browser on the client. In the future, when the client encounters web pages that include content that needs the newly added plug-in in order to be viewed, the web browser will be able to utilize the plug-ins' added functionality, but at the cost of having to continually devote space, in physical memory or on secondary storage, to storing the plug-in. The plug-in consumes physical memory or secondary storage space on the client when the plug-in is unused or even if the plug-in is used only once by the web browser. Additionally, the space consumed by plug-ins grows as the number of plug-ins the client encounters grows and as previously installed plug-ins are updated to new versions which typically take up more space than their predecessors. Also, plug-ins often comprise multiple files which are installed in various locations on the client when the plug-in is added to the web browser, thus, there is often no easy method provided to the user of the client to remove the plug-ins for which the user no longer has a need. Plug-ins are generally unsatisfactory for use with PDAs due to the storage space consumed by the plug-ins. As PDAs often have limited storage capabilities, the plug-ins' disadvantage of consuming storage space while sitting around unused is a significant barrier to the successful use of plug-ins with PDAs.

A more recent method for providing dynamic web pages involves the use of the Java programming language. The Java language is a well-known, machine-independent computer language that facilities dynamic display of information. "Applets" may be created using the Java language, which may comprise programs embedded within web pages that can interact with the user locally using "Java-capable" web browsers. The applet is typically transferred to the web browser with other web page information. The information used by the Java applet may be located on the same web page as the applet, on a different web page from the applet, or on an entirely different server. Applets themselves may request web pages or activate links.

More specifically, Java applets are sent to the client in the form of a message. The message may comprise a plurality of groups ("packets") of data which are sent over the communications link from the server to the client and then reassembled at the client. Once the message is received and reassembled at the client, the client opens the message and finds a program, which is the Java applet, inside. The user of the client may then execute the Java applet or the applet may execute automatically. Often, one of the first actions the Java applet would take would be to contact the server over the communications link. One common reason for the Java applet contacting the server is so that the Java applet can receive needed data, and another common reason is to begin loading a separate plug-in onto the client from the server. A further common reason for the Java applet to contact the server is to retrieve objects and classes used by the Java applet to access data, for example, Java Database Connectivity (JDBC) classes. The downloaded objects and classes will then typically retrieve the actual data the downloaded classes and objects will be used with.

Java applets may be used to address the space consumption problem associated with plug-ins. Java applets are often designed to be machine independent and have a low impact on the client. Typically, the Java applet will be transferred to the client, executed, and then disposed of. Unlike typical plug-ins, the Java applet may be removed by the Java Virtual Machine (discussed in more detail below). In addition, the operating system may be operable to discard Java applets.

Using Java applets is also not free of impact on the client however, as a Java Virtual Machine ("JavaVM"), which is similar to the plug-ins, must be provided on the client for the Java applet to function. The JavaVM is a program stored on and executed on the client which provides an interface between the machine independent code that comprises the Java applet and the specific requirements of the client. Typically, a given JavaVM implementation will execute only on a particular client or type of client, even though Java applets are machine independent. Storing the Java applet over the long term is advantageous as compared to storing multiple plug-ins, because one JavaVM will run Java applets regardless of what the Java applets are doing, while plug-ins typically provide only the particular dynamic ability that the plug-in has been designed to supply. The JavaVM typically discards applets when performing "garbage collection" on memory. Garbage collection typically includes discarding unused data, classes, applets, and other information from memory associated with the JavaVM which is no longer needed by any applet or application currently using the JavaVM. The JavaVM is typically operable to remove itself from memory when no more Java applets or Java applications are running which require the JavaVM. Multiple plug-ins will typically consume more space than the single JavaVM. For example, the Shockwave plug-in noted previously provides only Shockwave related services, and in order to add Structured Query Language (SQL) capabilities a separate SQL plug-in must be loaded onto and stored by the client. In contrast, the single JavaVM is operable to execute Shockwave-like Java applets and SQL-like Java applets, with the additional advantage that the Shockwave-like and SQL-like applets will remove and discard themselves when the user is done with them.

Java applets therefore offer an advantage over plug-ins to PDAs through the transient nature of the Java applets. The PDA is required to store only the JavaVM and generally is able to discard the Java applet when the PDA is done with the Java applet.

Another alternative for dynamic web pages may comprise ActiveX controls. ActiveX controls may or may not be machine independent. Thus, some ActiveX controls are limited to use with browsers and computers that are compatible with the ActiveX controls. ActiveX is similar to the plug-ins discussed previously, but may be used to provide more general capabilities to the client than most plug-ins. ActiveX controls, unlike Java applets, do not rely on a JavaVM-like interface between the controls and client, instead, ActiveX controls are often written to use the ActiveX plug-in for specific clients.

The basic concept of the web page is that there exists a division of responsibility between the client's web browser and the server's web page. The web browser typically locates, retrieves and displays the web pages, executes hyperlinks and applets, and generally interprets web page information. The web page comprises the raw data, hyperlinks, and HTML constructs that may be executed by the web browser.

Web pages and web browsers may be used on an intranet as well as the Internet. The web pages, web browsers, clients, and servers operate over an intranet in a manner similar to the operation of the web pages, web browsers, clients, and servers over the Internet.

Both the Internet and intranets are typically formed using wire-based networks. Wire-based networks generally use cabling, such as co-axial cable or fiber optic cable, to connect clients and servers. However, other methods besides cables may be used to form networks and couple clients and servers.

Wireless networks are one alternate method for coupling clients and servers. Wireless networks, in comparison to wire-based networks, are typically not capable of transmitting data as quickly as the wire-based networks. Thus, wireless networks are said to have a lower speed and a lower bandwidth than the wire-based networks. For example, an infrared network could be used for wireless networking.

The small size of PDAs and the need for PDAs to be portable often make them unsuited to wire-based networks and thus these systems often use wireless networking, such as an infrared network or a cellular phone network, for communication with other computers. Often, wireless networks do not have the speed to carry the amount of data that computers often share with each other. In particular, referring to the plug-ins described above, the transferring and installing of the plug-ins on the PDA requires both patience and foresight. Patience is required because the plug-ins are typically designed to be transferred across wire-based networks and significantly greater time may be required to transfer the plug-ins across a wireless network. Foresight is required because the user must decide whether to commit part of the limited storage of the PDA to storing the plug-ins and whether the plug-ins will provide functionality sufficient to justify devoting storage resources on the PDA to the plug-ins. Java applets provide a better alternative to PDAs, as Java applets require a lower storage commitment than the plug-ins. However, Java applets, once transferred, typically must go back out over the wireless network two or more times. Once, to get classes and objects needed by the applet, and again to get the very data that the Java applet requires to make the Java applet useful to the user of the PDA. Thus, not only has the Java applet user had to wait for the Java applet to transfer to the PDA, but must wait a further period of time for the Java applet to transfer needed classes, objects and data over the network to the PDA. According to the teachings of the present invention, a Java applet can be augmented to address this problem by including all or most of the required data and the associated functionality in a single transmission to the client.

FIG. 1 is a block diagram of a client-server system 10 constructed according to the teachings of the present invention that comprises a client 12 coupled to a server 18. A communications link 16 may either directly connect the client 12 to the server 18 or indirectly connect the client 12 to the server 18 through a network 14. In the disclosed embodiment, the client 12 may comprise a handheld or credit-card-size portable computing device with limited physical memory, as compared to the server 18, and limited or no secondary storage. For example, the client 12 may comprise a PalmPilot by 3Com Corporation or a cellular phone which comprises the ability to display alphanumeric information. The client 12 may also comprise any other suitable type of computer or electronic device comprising physical memory that may be coupled to the communications link 16. The client 12 further allows a human operator (not shown) to use the client 12 to retrieve, access, manipulate and display information on the client 12. In a typical application, the client 12 transmits a data request over the communications link 16 to the server 18. The client 12 is described later in more detail in association with FIG. 2.

In the disclosed embodiment, the network 14 may comprise the Internet or another suitable type of Local Area Network (LAN), Medium Area Network (MAN), Wide Area Network (WAN), intranet or any other suitable computer network well-known in the art. In the disclosed embodiment, the communications link 16 may comprise a wireless communications link having relatively low-speed as compared to wire-based networks. "Low-speed" is used here to denote that the communications link is a limited resource as opposed to an actual number. Specifically, low-speed generally refers not to the absolute speed of the communications link, but the rate at which the communications link may transfer information versus the amount of data that is sought to be transferred over the communications link. The communications link 16 may also comprise any other suitable kind of communications link that constitutes a relatively limited resource as compared to the processing and storage capabilities of the remainder of the system. The communications link 16 may comprise any of a variety of other suitable wireless and non-wireless communications links well known in the art for coupling clients 12 to servers 18.

For example, OC-48 is a wire-based communications link that is capable of transferring 2.488 gigabits per second (gbps). OC-48 could be classified as a low-speed link if OC-48 is used to couple computers having a need to transfer data at the rate of, for example, 100 gbps. For another example, an IrDA infrared communications link, which is one standard used for providing an infrared communications link, generally provides a wireless connection at about 115 kilobits per second (kbps), which comprises a low-speed communications link when compared to 10 megabit per second (mbps) wire-based Ethernet networks. In absolute numbers 115 kbps may not be low-speed, but when a 115 kbps communications link is used with a program designed to be transferred over 10 mbps Ethernet, the 115 kbps communications link is low-speed in the sense that the 115 kbps communications link is a limited resource that must be accommodated by the remainder of the system.

Returning to FIG. 1, the client-server system 10 further comprises the server computer 18 hosting a web server application 20. The server computer 18 receives the requests from the client 12 and may transmit and receive data from a plurality of data sources 22, 23, and 24. The data sources 22, 23, and 24 provide various data and content information which may be either static or dynamic. The server computer 18 may also comprise any of a variety of suitable server computer systems well known in the art which operate similarly to the server 18. In the disclosed embodiment, the web server application 20 is an application program running on the server 18 for communicating with multiple clients 12 using a communications protocol such as the HyperText Transfer Protocol (HTTP) and for generating an applet 26 (shown in more detail in association with FIG. 2). The web server application 20 handles requests from the client 12 sent to the server 18. The web server application 20 may also be any of a variety of suitable and well-known applications and programs for processing web data requests from the Internet, an intranet or an extranet, and which may execute external programs or applications which add further functionality to the web server application 20. The data sources 22 through 24 may comprise other logical or physical computer systems coupled to the network 14 that may be contacted by or communicate with the server 18. The data sources 22 through 24, in the disclosed embodiment, each comprise a plurality of content and data items 28 therein that may be retrieved or utilized by the web server application 20. The server application 20 collects data items 28 in response to the request. The web server application 20 may also communicate with the client 12 using any suitable communications protocol. For example, HTTP, the File Transfer Protocol (FTP), or the Telnet protocol may be used.

The applet 26, in the disclosed embodiment, may comprise a Java, ActiveX or other suitable type of applet which can be executed by the client 12. The applet 26 may also be encoded using any other suitable programming language, scripting language, or the like suitable for use on the client 12. According to the teachings of the present invention, when the applet 26 is generated, the applet 26 does not merely contain an executable program as with typical applets. In contrast, the applet 26 also comprises particular services and data for the client 12 based on the request. The applet 26 may be generated either directly by the web server application 20 or by an external program utilized by the web server application 20. The applet 26 is described in more detail in association with FIG. 2.

The teachings and advantages of the present invention may be best understood in the context of an example. A person with a cellular phone, which acts as the client 12, may desire to purchase a drink from a vending machine, which acts as the server 18. The cellular phone may communicate with the vending machine using an infrared data link, which acts as the communication link 16 and forms a direct link to the vending machine. In order to illustrate the benefits of the present invention, this example will present the above transaction using the traditional method followed by the transaction using the teachings of the present invention.

Using the traditional method the cellular phone would be required to be executing a web browser, executing the web browser requires the user to select the web browser on the cellular phone and wait for the web browser to start executing. The web browser on the cellular phone would likely be a general purpose web browser because the web browser would be required to handle contact with any suitable website, thus, the web browser would likely take up a significant amount of the limited storage capability of the cellular phone and require significant start-up time due to the limited processing power of the cellular phone. The cellular phone would then contact the vending machine over the infrared data link and the vending machine would transfer all of the data representing available drink types and available stock of drinks. The vending machine would also be transferring all of the HTML code required to format the drink type and availability data so that the web browser could properly display the data. Since only the data and formatting codes for the data are provided by the server, the processing of the formatting commands would be done by the web browser executing on the cellular phone. The vending machine may also provide the user the ability to purchase a drink using the user's credit card, however, in order to complete the credit card transaction the vending machine may have to transfer a plug-in to the client to enable the user to use the user's credit card with the vending machine. The user will likely be required to wait while a plug-in is transferred over the low-speed infrared link. Once the user has purchased the desired drink, the web browser may stop executing. The user has now invested time in waiting for the browser to launch, receiving vending machine data, receiving the credit-card-purchase plug-in and ending the web browser. The user has also committed storage resources to storing the credit-card-purchase plug-in and if the web browser did not inform the user that the plug-in was being loaded, the user may have committed the storage resources without the user's knowledge. If different vending machines, such as those provided by Coke® and Pepsi®, use different credit-card-purchase plug-ins, the user will quickly run out of storage on the cellular phone trying to buy drinks.

Using the teachings of the present invention, in response to the person entering the proper commands into the cellular phone, the cellular phone will send a data request over the infrared communications link to the vending machine. The data request represents the desire by the user of the cellular phone to purchase a drink from the vending machine. The vending machine will then construct an applet having the available drink types and available stock information, along with whatever data manipulation abilities are required to use such type and availability information. More specifically, the applet can provide the user the ability to scroll through the type and availability information and to select a particular drink. The applet requires much less functionality than the web browser since the server knows what information is being provided to the cellular phone and what functionality is required to use the data as opposed to being a general purpose web browser. In particular, the applet requires that the cellular phone comprise a JavaVM so that the applet may execute on the cellular phone. If the vending machine provides the ability to purchase the drink with a credit card, the necessary credit card transaction functionality may be included in the applet by the vending machine. All the processing to create and transmit the applet is performed by the vending machine. As the vending machine likely comprises greater storage and processing capabilities than the cellular phone, the generation of the applet will likely be faster and more efficient than waiting for the web browser on the cellular phone to format the data received from the vending machine using the less powerful cellular phone. The generated applet will then be transferred to the cellular phone over the infrared link. Once the applet is transferred, the cellular phone has all of the data and processing routines the user needs to purchase the drink and the applet may begin executing. The start-up time for the applet will likely be less than the start-up time required for the web browser because the applet is customized to perform a specific set of tasks and will likely be smaller than the web browser. Once the user has selected a particular drink and completed the transaction, the applet can be discarded and the cellular phone has suffered no loss of storage resources.

Figure 2:
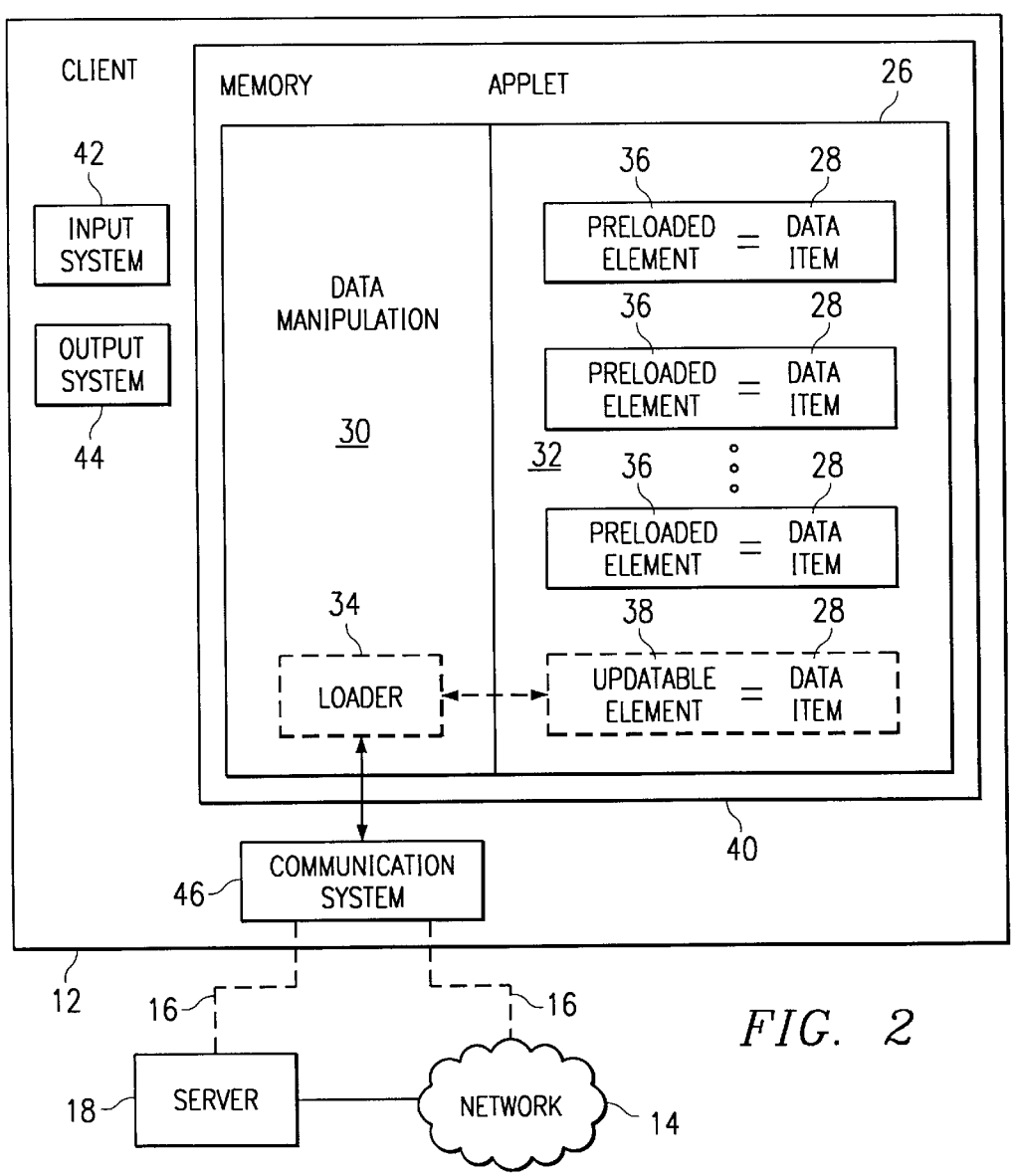
FIG. 2 is a block diagram showing further details of the system of FIG. 1.

FIG. 2 is a block diagram showing further details of the system of FIG. 1. As discussed previously, because of the unique construction of the applet, the applet 26 comprises both a data manipulation system 30 and a data storage system 32 which are each constituent systems associated with the applet 26. The data manipulation system 30 may also comprise a portion of the applet 26, similarly, the data storage system 32 may also comprise a portion of the applet 26. The data manipulation system 30 includes all capabilities required for the operator of the client 12 to utilize data in the data storage system 32. The data manipulation system 30 enables the applet 26 to handle the various characteristics associated with the data included in the applet 26 items 28 retrieved in response to the request from the client 12 and to handle client specific characteristics. In particular, the data manipulation system 30 of the applet 26 will provide the client 12 with whatever suitable data interface is required to access and utilize the data in the data storage system 32. For example, if the data manipulation system 30 includes data which requires the functionality associated with a particular database system, the data manipulation system 30 will include suitable functionality for accessing the database data included in the applet 26 in the data storage system 32. The data storage system 32 comprises a plurality of pre-loaded elements 36 representing non-updateable data items 28. The pre-loaded elements 36 are each initialized using respective data items 28 retrieved by the web server application 20 in response to the request. The pre-loaded elements 36 are non-updateable in the sense that the pre-loaded elements 36 will only change in response to data or input from the client 12 and will not be updated with information acquired over the communications link 16 after the applet 26 has been transferred to the client 12. The pre-loaded elements 36 serve to decrease the amount of data transmitted over the communications link 16 by eliminating or decreasing the need for the applet to have generic data access and collection functionality. As noted above, the communications link 16 may comprise a low-speed wireless link. Due to the low speed available, the least amount of data should be transferred over the communications link 16. By representing the data items 28 as pre-loaded, non-updateable elements in the applet 26, the total size of the applet 26 is reduced. Reducing the size of the applet 26 is also useful when the client 12 comprises limited physical memory capabilities. When the client 12 comprises limited physical memory capabilities, the smaller the size of the applet 26, the smaller the impact on the physical memory of the client 12 by the applet 26.

The data manipulation system 30 may include specific functionality required by the data in the data storage system 32. By combining the functionality in the data manipulation system 30 with the data of the data storage system 32 the design methodology behind the applet 26 can be shifted from the traditional focus on writing a generic program one time and using that program with a variety of different data types, to writing a program specifically for particular data. By shifting the design methodology from generic to specific, the data manipulation system 30 can be optimized for the data included in the data storage system 32. In addition, the tying together of the data in the data storage system 32 with the functionality in the data manipulation system 30 allows for an overall decrease in the size of the applet 26 as little or none of the overhead associated with generic functionality need be included. The total number of accesses made over the communications link 16 from the client 12 is also decreased by including the data requested by the client 12 in the applet 26 as part of a single transmission. Stated another way, instead of downloading generic program functionality to the client 12 and then having the program use the communication link 16 in order to access required data, the needed functionality and the required data are bundled together in the applet 26 and may be transferred to the client 12 as part of the single transaction.

The applet 26 may be generated in a variety of ways. The applet 26 may be generated by combining various predefined units together based on the data in the data storage system 32. The applet 26 may also be generated by using templates which are customized based on the data to be included in the data storage system 32. The templates may define data that is to be added to existing code, code that is to be added to existing code, entirely new code, class definitions, class names, and other suitable program elements. For example, based on the data to be added to the data storage system 32, a prewritten procedure may be added to the data manipulation system 30 to allow the user to scroll a display in order to see all of the data, a catalog class could be created because the data is from a product catalog, and database access functionality could be added to the data manipulation system 30 because the data is stored in a particular database format.

When the applet 26 is generated, the programmatic capabilities for utilizing the data items 28 represented as pre-loaded elements 36 in the applet 26 are included in the data manipulation system 30. Thus, the applet 26 need not rely on a substantial amount of functionality being available on the client 12. In particular, the applet 26 need not rely on a substantial amount of functionality being provided on the client 12 for manipulating the data in the data storage system 32 of the applet 26. Accordingly, in contrast to the plug-ins discussed previously, the applet 26 does not require substantial preloading of software onto the client 12 before the applet 26 may execute. Also, as a result of the data manipulation system 30 comprising the required functionality to use and manipulate data in the data storage system 32, the applet 26 may be utilized by the client 12 even after the client 12 is no longer coupled to the communications link 16 or to the server 18. In addition, once the client 12 is finished with the applet 26, the applet 26 may be substantially discarded by the client 12, unless the client 12 wishes some part of the applet 26 to remain on the client 12. When the client 12 comprises limited memory and no secondary storage capability, such as when the client 12 comprises a PDA, the client 12 has no substantial spare memory in which to store information the client 12 no longer needs.

Another way of looking at the applet 26 is to consider the applet 26 as comprising a program, which acts as the data manipulation system 30, with a particular payload of data occupying the data storage system 32. When the applet 26 is generated by the server 18, the data manipulation system 30 may be customized as a function of the data items 28 represented in the data storage system 32. The data storage system 32 is more than merely a collection of data structures and variables as the contents of the data storage system 32 may be collected in response to the request from the client 12 and are typically specific to the request. Additionally, the contents of the data storage system 32 may represent current data that may have become available only very recently, or may even have been created in response the request.

Referring back to the example of the person trying to buy a drink from the vending machine using the cellular phone, the applet generated by the vending machine for the cellular phone would comprise whatever programmatic capabilities the vending machine required the cellular phone to have in order to purchase a drink. In particular, the vending machine may generate the applet with the types of drinks available and the unavailable stock of drinks in the data storage system 32 while also providing the applet the ability to manipulate the type and availability information in the data manipulation system 30. In contrast to the general web browser discussed previously in association with the cellular phone example, the data manipulation system 30 of the applet for the cellular phone will likely consume less space on the cellular phone than the general purpose web browser because the data manipulation system 30 of the applet for the cellular phone may be customized by the vending machine and provide only the functionality that is currently required by the applet.

Some applications may be implemented more efficiently with a combination of pre-loaded, non-updateable data, data manipulation functionality, and a limited number of updateable elements 32. For example, a person with a PalmPilot may desire to purchase a book from an on-line bookseller. The PalmPilot is a PDA and typically uses a low-speed wireless communications link for communication with the server, as well as having limited storage and limited processing capabilities relative to a server associated with the bookseller. The bookstore example will be presented using both the traditional web browser method and according to the teachings of the present invention.

Using the traditional web browser method, the data and formatting information needed to represent the author, title and price ("author-title-price information") of all available books is transferred to the web browser executing on the PalmPilot. The web browser is likely a general purpose web browser because the web browser likely provides general capabilities to browse websites similar to the general purpose web browser discussed previously in association with the drink example. The web browser then processes and displays the transferred data on the PalmPilot. The user may then select a particular book and the bookseller may transfer availability, review and excerpt ("availability-review-excerpt") information to the PalmPilot which must be formatted by the web browser executing on the PalmPilot. If the user wishes to consider another book, the user will have to return to the previous display of the author-title-price information. However, since the PalmPilot has a limited storage capacity, there may not have been sufficient storage capacity for the PalmPilot to simultaneously store the web browser, the plug-ins associated with the web browser, the author-title-price information from the bookseller, and the availability-review-excerpt information, thus, the PalmPilot may have discarded the author-title-price information in order to store the availability-review-excerpt information. If the PalmPilot has discarded the author-title-price information, all of that information will have to be retransferred to the PalmPilot over the communications link and again be formatted by the web browser using the limited processing capabilities of the PalmPilot.

According to one embodiment of the present invention, the server system associated with the bookseller may dynamically determine that the applet generated for the PalmPilot will comprise titles of all available books, the authors of such books, and the price of each book ("author-title-price information") as pre-loaded, non-updateable elements while also including updateable information representing the availability of each book, an excerpt and review of each book ("availability-excerpt-review information") as updateable elements. In this example, the author, title and price are relatively small pieces of information that the user needs to know about every book, while the availability, excerpt, and review are relatively large pieces of information that the user will want to know for only certain books. Additionally, the availability may be constantly changing and greater efficiency is achieved by using the powerful processing capabilities and large storage capacity of the server to perform the updating and tracking of the availability rather than having the less powerful, low-storage capability PalmPilot do the updating and tracking. Thus, the storage and processing capabilities of the server are utilized to decrease processing and memory usage on the PalmPilot. The total amount of data transferred over the low-speed link is decreased because the relatively large data is transferred only as needed and the functionality needed for the PalmPilot to browse the data is transferred only once during the initial communication. Furthermore, since the author, title, and price are stored as pre-loaded, non-updateable elements in the applet, the user need not transfer this information from the server again.

The availability-excerpt-review information will not be needed for every book and will only need to be supplied to the client when needed by the user. The updateable elements in the above example would probably not be initialized by the server because at the time of the user's request, the server does not know which books the user wishes to purchase and, to decrease the amount of information transferred over the communications link, the server will not transfer the availability-excerpt-review information to the client until that information is needed. However, if the server knows from previous transactions something about the particular user, some or all of the updateable elements might be initialized with availability-excerpt-review information based on the server's prediction of how to decrease the total amount of information transferred. The availability-excerpt-review information might be supplied if, for example, the server knows that the particular user typically buys books by a particular author. In this manner, although two sequential communication sessions take place, the total amount of information transferred is less than under traditional methods, thus allowing the applet to more efficiently utilize the low-speed communications link and the limited storage and processing capabilities of the PalmPilot.

Accordingly, the data storage system 32 may further comprise the plurality of optional updateable elements 38 which are each optionally initialized using selected data items 28. The data items 28 maybe selected dynamically from the data items 28 based on a plurality of criteria. The criteria may include a dynamic determination of whether each data item 28 is likely to require independent updating by the applet 26 in order to appropriately respond to the client's 12 request. Other criteria may be used in other combinations in order to determine which data items 28 should be represented by updateable elements 38 in the applet 26.

The data manipulation system 30 may further comprise an optional loader 34 which may be used to update the updateable elements 38 with updated data items while the applet 26 is running on the client 12. The loader 34 updates the updateable elements 38 using a communication system 46 on the client 12 to communicate with the server 18.

The client 12 further comprises memory 40 which stores the applet 26 while the applet 26 is executing. Memory 40 may comprise Static Random Access Memory (SRAM), Dynamic Random Access Memory (DRAM), flash memory, or other memory technology suitable for use with the client 12. The client 12 further comprises an input system 42, an output system 44, and the communications system 46. The input system 42 allows the operator of the client 12 to interact with the client 12 and the applet 26. The output system 44 allows the operator of the client 12 to receive output from the client 12 and, more particularly, the output of the applet 26. The communications system 46 allows the client 12 to communicate with the server over the communications link 16. As an example to illustrate the above, the client 12 may comprise a PalmPilot computer. The input system 42 of the PalmPilot comprises the pen, screen, and writing area used to interact with the PalmPilot. The output system 44 of the PalmPilot comprises the screen upon which the user may view the results of the user's input. The communication system 46 of the PalmPilot may comprise the infrared link found on some models of the PalmPilot.

Figure 3:
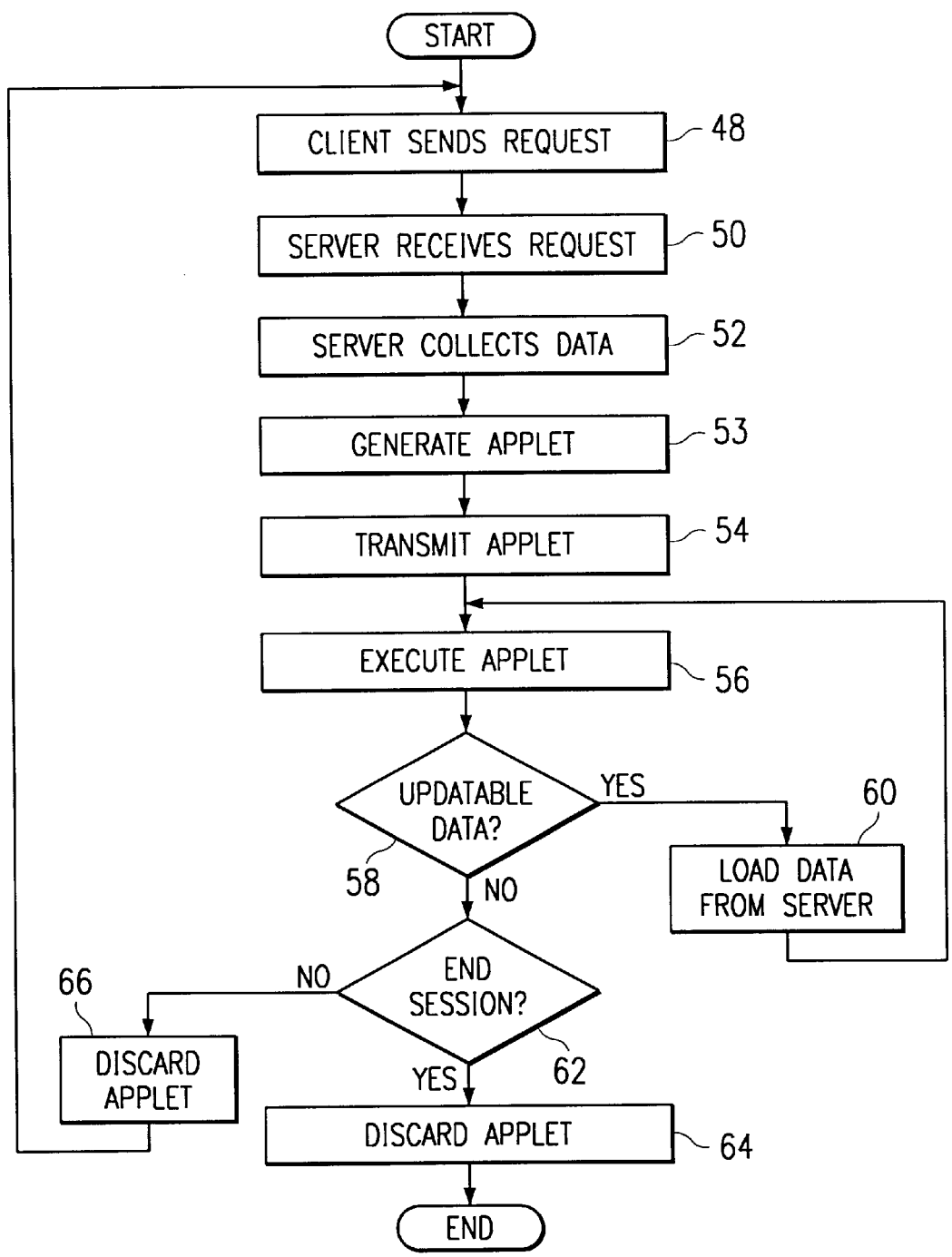
FIG. 3 is a flow chart showing the operation of a client-server system constructed according to the teachings of the present invention.

FIG. 3 is a flow chart showing the operation of the client-server system 10 of FIG. 1. The method begins at step 48 where the client 12 initiates communication with the server 18 by sending the request over the communications link 16. The method proceeds to step 50 where the server 18 receives the request and hands the request off to the web server application 20 for handling.

The method proceeds to step 52 where the server 18 collects the data items 28 that represent an appropriate response to the request from the client 12. The web server application 20 may collect the data from the plurality of data sources 22 through 24 and the server 18.

The method proceeds to step 53 where the web server application 20 or an external application generates the applet 26, once the appropriate data items 28 have been collected.

In order to decrease the amount of data transmitted over the communications link 16, the data items 28 may be represented by the pre-loaded elements 36 in the applet 26. When the applet 26 is generated, the applet 26 also comprises substantially all of the data manipulation capabilities for reviewing, manipulating, and utilizing the data items 28 represented by pre-loaded elements 36 in the applet 26. Since the applet 26 comprises substantially all of the data items 28 appropriate to respond to the request, repeated transfers of information over the communications link 16 may be avoided. Stated another way, the pre-loaded elements 36 may leech off of the loading of the data manipulation capabilities to provide data and functionality to the applet 26.

The applet 26 may also be generated with the data items 28 represented as both pre-loaded elements 36 and updateable elements 38. Based on the request from the client 12 and the data items 28 collected in response to the request, the web server application 20 may dynamically determine whether or not the applet 26 should have updateable information in the form of the updateable elements 38. The determination of whether to include updateable elements 38 in addition to the pre-loaded elements 36 may be based on a dynamic determination made at the time the applet 26 is generated as a function of a prediction of whether or not the addition of the updateable elements 38 will result in a lower total amount of information that must be transferred over the communications link 16 as compared to representing all of the data items 28 using pre-loaded elements 36. Referring again to the online bookseller example, if the user were attempting to purchase a book from an online bookseller, the user of the client 12 may need to know the title of the book, the author of the book, and the price of the book. At some point, the user may decide to purchase a particular book and the user will then want to see an excerpt of that book and whether or not any copies of that book are available. Instead of transferring the excerpt and availability of every book along with the title, author, and description, the web server application 20 may generate the applet 26 to have the author, title and price as respective pre-loaded elements 36 while the availability and excerpt information are not transferred. The availability and excerpt information may be included as updateable elements 38 so that the availability and excerpt information are sent later for only the book the user wishes to purchase. While updateable links require multiple transmissions of information across the communications link 16, the total amount of information transferred will be less because the user will not be required to again download the entire applet 26, only the small amount of information the client 12 is now requesting. The use of both pre-loaded elements 36 and updateable elements 38 also allows the client 12 to avoid resending duplicate data over the communications link 16 by updating only individual updateable elements 38 as needed.

Referring again to FIG. 3, the method proceeds to step 54 where the applet 26 is transmitted from the server 18 over the communications link 16 to the client 12. The method proceeds to step 56 where the client 12 loads the applet 26 into memory 40 and executes the applet 26. During execution, the client 12 may view data, manipulate data and otherwise utilize the applet 26.

The method proceeds to a decisional step 58 when the operator of the client 12 has indicated that the applet 26 requires new or updated data which may require updating the updateable elements or may require an entirely new applet to be generated as shown in the following steps. Continuing the example above of buying a book, the operator may have selected a particular book and is now requesting excerpt and availability information on the selected book. A check is performed by the applet 26 based on the request of the client 12. If the new or updated data requested by the client 12 has been previously represented by updateable elements 38 then the YES branch of decisional step 58 is followed. If the YES branch of decisional step 58 is followed, the method proceeds to step 60 where the loader 34 updates the respective updateable elements 38 that require updating with further data items sent by the web server application 20. The method then returns from step 60 to step 56 where the applet 26 continues to be executed on the client 12. Returning to decisional step 58, if the applet 26 has no updateable elements 38 or if the new data desired by the client 12 has not been represented using updateable elements 38, then the NO branch of decisional step 58 is followed and the method proceeds to decisional step 62.

At decisional step 62 a check is made by the applet 26 to see if communications session of the client 12 with the server 18 has ended, for example, if the user has instructed the applet 26 to end. If the client 12 is done communicating with the server 18, then the YES branch of decisional step 62 is followed which proceeds to step 64 where the applet 26 may be substantially discarded by the client 12. In step 64, the applet 26 typically leaves substantially no remnants of itself on the client 12 so as to conserve physical memory resources on the client 12. However, the applet 26 may leave data or other information on the client 12 at the request of the client 12. Also in step 64, if the applet 26 has been generated to send return information back to the server 18 when the client 12 discards the applet 26, the applet 26 will transmit the return information. For example, if the server 18 wishes to keep a record of how the client 12 used the applet 26, the record would be transmitted back to the server in step 64.

Returning to decisional step 62, if communication session of the client 12 with the server 18 is not complete then the NO branch of decisional step 62 is followed and proceeds to step 66. If the communication session is not complete, then the client 12 may be sending a completely new request to the server 18 or may be requesting new data that was not represented by updateable elements 38 in the applet 26. At step 66, the applet 26 is discarded in a manner similar to that in step 64, and the method returns to step 48 so that a new transaction may begin to handle the new request from the client 12 and result in a new applet 26 will be generated.

The teachings of the present invention allow a server computer to provide data and applications of various types to clients without the use of plug-ins. The data and information may be packaged together in an applet with associated functionality for the data and information. The data and information may be represented using pre-loaded, non-updateable elements or through a selected combination of non-updateable elements and updateable elements in the applet based on a prediction made by the server regarding which method will result in lower total amounts of information being transferred over a low-speed link coupling the server to a client. Thus, more efficient use of client and communications link resources over traditional methods is provided.

Although several alternative embodiments have been illustrated and described in detail, it should be understood that various changes, substitutions and alterations can be made therein without departing from the scope of the present invention. For example, although the disclosed server is represented by a single computer, the system could comprise multiple servers instead of a single server. Moreover, although the disclosed data sources are shown as connecting to the network, the data sources may be directly coupled to the server, such as in a fire walled corporate intranet or datastore. In addition, although the disclosed embodiment utilizes the Internet, an intranet could be used.

It should also be recognized that direct connections disclosed herein could be altered such that two disclosed components or elements would be coupled to one another through an intermediate device or devices without being directly connected, while still realizing the present invention. Other changes, substitutions and alterations are also possible without departing from the spirit and scope of the present invention, as defined by the following claims.

What is claimed is:

1. A data processing system comprising:
   a server coupled to a communications link and operable to receive a request from a client device and to collect a plurality of data items, wherein the data items comprise specific information collected as a function of the request;
   an executable applet dynamically generated by the server in response to the request, a constituent system associated with the applet comprising a subset of the data items, each data item in the subset used as at lease one pre-loaded value in the applet;
   a further constituent system associated with the applet comprising a data interface capability configured to provide a plurality of operations on the pre-loaded values, the operations comprising operations associated with the subset of the data items; and
   the applet operable to be transferred over the communications link to the client device.

2. A data processing system according to claim 1, wherein the pre-loaded values are non-updateable.

3. A data processing system according to claim 1, wherein the client device comprises a wireless phone.

4. A data processing system according to claim 3, wherein the client device comprises a personal digital assistant.

5. A data processing system according to claim 1, wherein the communications link comprises a wireless communications link.

6. A data processing system according to claim 5, wherein the wireless communications link comprises a cellular phone network.

7. A data processing system according to claim 5, wherein the wireless communications link comprises an infrared communications link.

8. A data processing system according to claim 1, wherein the applet is further operable to be substantially discarded from the client following execution of the applet and access of the subset of the data items.

9. A data processing system according to claim 8, wherein the constituent system associated with the applet is substantially discarded when the client device communicates a further data request to the server over the communications link.

10. A data processing system according to claim 1, wherein the applet further comprises a plurality of updateable elements and wherein the pre-loaded values are non-updateable.

11. A data processing system according to claim 10, wherein the updateable elements are initialized during the generation of the applet based on a further subset of the data items.

12. A data processing system according to claim 11, wherein the data items comprising the further subset are selected based on a prediction which represents a total amount of information expected to be transferred over the communications link.

13. A data processing system according to claim 11, wherein the data interface capability is further configured to provide a further plurality of operations on the updateable elements of the client device, the operations comprising operations specific to the further subset of the data items and wherein the capability further includes a loader which is operable to independently update each updateable element with a further respective data item from the server.

14. A data processing system according to claim 1, wherein a further constituent system associated with the applet includes a data interface capability configured to provide a plurality of operations on the pre-loaded values to the client device, the operations comprising operations specific to the subset of the data items.

15. A data processing system according to claim 14, wherein the capability further comprises substantially all functionality required by the pre-loaded values.

16. A data processing system according to claim 1, wherein the applet comprises a Java programming language applet and the data request comprises a web page request.

17. A method of processing data comprising:
   receiving a data request from a client device at a server system over a communications link;
   collecting on the server a plurality of data items in response to the data request;
   generating an executable applet dynamically in response to the data request, a constituent system associated with the applet including a subset of the data items therein as pre-loaded values;
   wherein a further constituent system associated with the executable applet comprises a data interface capability configured to provide a plurality of operations on the pre-loaded values, the operations comprising operations associated with the subset of the data items; and transferring the applet to the client device.

18. A method of processing data according to claim 17 further comprising discarding the applet by the client device following execution of the applet and access of the subset of the data items.

19. A method of processing data according to claim 17, wherein the applet further comprises a plurality of updateable elements, wherein the pre-loaded values are non-updateable, and wherein generating an executable application further comprises initializing the updateable elements based on a further subset of the data items.

20. A method of processing data according to claim 19, wherein initializing the updateable elements further comprises predicting a total amount of information to be transferred over the communications link based on the data items and selecting the further subset based on the prediction.

21. A method of processing data according to claim 20, wherein the further constituent system further comprises a loader, and further comprising updating the updateable items over the communications link using the loader.

22. A method of processing data according to claim 17, wherein the communications link comprises a wireless link.

23. A method of processing data according to claim 17 and further comprising manipulating the pre-loaded values using a plurality of operations in the further constituent system associated with the applet, the operations comprising operations specific to the pre-loaded values and wherein the pre-loaded values are non-updateable.

24. A method of processing data according to claim 17, wherein the data request comprises a web page request and the applet comprises a Java applet.

25. A method according to claim 24, wherein transferring the applet comprises transferring the applet using a hypertext transfer protocol.

26. A method according to claim 17, wherein the pre-loaded values are non-updateable.

27. A data processing system comprising:

a communications link;

a handheld, portable client device coupled to the computer network;

a web page request transmitted over the communications link from the client device;

a web page server system being coupled to the communications link and being operable to receive the web page request and to collect a plurality of data items from a plurality of sources in response to the web page request and wherein the data items comprise information collected as a function of the request; and an executable applet dynamically generated by the server system comprising a first portion and a second portion, the first portion comprising a first subset of the data items as respective pre-loaded and non-updateable values therein and a second subset of the data items as respective initial values for respective updateable elements, the second portion comprising an interface capability which is operable to allow the client device to manipulate the applet in response to input from a client device user and to allow the applet to update the updateable elements using data from a location remote from the client device, the applet executable on the client device, the applet further operable to be substantially discarded after the client device transmits a further web page request to the server, and the applet transmittable over the communications link to the client device.

* * * * *